United States Patent Office 3,753,900
Patented Aug. 21, 1973

---

3,753,900
PROCESS FOR THE REMOVAL OF SULPHATE FROM BRINES
Marvin D. Moore, 1531 Carson Court,
Homewood, Ill. 60430
No Drawing. Filed Dec. 3, 1971, Ser. No. 204,690
Int. Cl. C02b 5/02
U.S. Cl. 210—45
2 Claims

ABSTRACT OF THE DISCLOSURE

A process is illustrated for removing sulphate from aqueous solutions by adding strontium carbonate or chloride to the solution and removing the insoluble strontium sulphate so formed. Strontium sulphate can then be reacted with ammonium carbonate, an amine carbonate, or sodium carbonate to regenerate strontium carbonate which can then be reused in the process.

DESCRIPTION OF THE INVENTION

The present invention relates to the removal of sulphate ions from aqueous solutions and particularly natural and waste brines.

It is frequently desirable to remove sulphate from natural and waste brines prior to subsequent processing of the brines. For example, in the desalinization of sea water by distillation, considerable difficulty is encountered from the deposition of calcium sulphate on the evaporator tubes employed. Similarly, in the production of chlorine and caustic soda by electrolysis of sodium chloride brine in mercury cells, it is recognized that the brine must be kept low in sulphate content in order to avoid excessive attack on the graphite electrodes.

It has been recognized that barium chloride or barium carbonate can be employed to precipitate sulphates from brines. The problem associated with this technique is principally one of economics. The precipitated barium sulphate is only marginally useful itself and commercially attractive techniques for recovering barium from the sulphate precipitate in a reuseable form are not readily available.

An additional suggested method for desulphating brines is based on the precipitation of sulphate with barium sulfide via an ion exchange process which yields barium sulphate and an impure sodium sulfide solution. The barium sulphate is then run through a rotary kiln with carbonaceous material to regenerate the barium sulfide. The disadvantages accompanying this technique include the necessity for a large capital investment, potential air pollution problems due to dust and fumes from the rotary kiln and the problems associated with the disposal of the impure sodium sulfide.

Accordingly, it is an object of the present invention to provide a process for removing sulphate from aqueous solutions which is inexpensive to accomplish in either small or large operations and which presents no problems with respect to air or water pollution.

A related object resides in providing a process for the removal of sulphate ions by the precipitation thereof in an insoluble form and wherein the sulphate precipitate can be inexpensively converted to a material reuseable in the process.

Other objects and advantages of the present invention will become apparent as the following description proceeds.

While the present invention is susceptible of various modifications and alternative constructions, there will be herein described in detail the preferred embodiments. It is to be understood, however, that it is not intended to limit the invention to the specific forms disclosed. On the contrary, it is intended to cover all modifications and all alternative constructions falling within the spirit and scope of the invention as expressed in the appended claims.

Briefly stated, the present invention involves removing sulphate ions from aqueous solutions as a strontium sulphate precipitate. While somewhat more soluble than its barium counterpart, it has been discovered that for most commercial applications precipitation of sulphate with strontium is effective in lowering the sulphate content of the system treated to an acceptable level. After precipitation, strontium sulphate can be inexpensively and simply treated to convert the included strontium into a form rendering it reuseable in the process without presenting associated problems with respect to air or water pollution.

In its most preferred form, the present invention involves forming an aqueous mixture containing sulphate ions and strontium carbonate or strontium chloride and thereafter recovering the strontium sulphate precipitate formed. The precipitated strontium sulphate can then be dispersed in water and treated with ammonium carbonate to convert the sulphate to strontium carbonate. The carbonate can then be directly reused in the process or converted to strontium chloride with hydrochloric acid if use of the chloride is desired.

In accomplishing the present invention, the use of strontium chloride is ordinarily preferred since it is soluble in aqueous systems and the precipitation of the sulphate can be rapidly accomplished. However, for some applications the use of strontium carbonate is accompanied by particular advantages in addition to the removal of sulphate. For example, with respect to brines employed in electrolysis, the brines are frequently acidic at one stage of the electrolysis process and, since the brine must be essentially neutral when it is placed in the electrolytic cell, it is common practice to add sodium carbonate to the acidic brine to neutralize it. However, in accordance with an aspect of the present invention, strontium carbonate can desirably be employed to not only effect the removal of sulphate ion but in addition to aid in neutralizing the brine thus reducing the necessary quantity of sodium carbonate which must be subsequently added.

In keeping with the present invention, the formation of the strontium sulphate precipitate using either the carbonate or chloride can be effected at mild temperatures which ordinarily are on the order of about 30° F.–150° F. Higher temperatures, e.g., up to about 200° F. can also be employed with associated faster reactions, particularly when strontium carbonate is employed. When strontium carbonate is used, it is preferably employed in a finely divided form, e.g., less than about 200 mesh, and the brine is agitated so as to effect intimate contact between the dissolved sulphate ions and the carbonate particles in order to achieve reaction therebetween. The reaction using either the carbonate or chloride readily proceeds at the above-indicated temperatures though separation of the strontium sulphate is usually effected after an extended time, e.g., 6–12 hours, in order to permit settling of the sulphate. With small reaction vessels or the use of settling aids, this time can be considerably shortened.

A particularly desirable feature of the present invention is that once the sulphate has been removed from the system as strontium sulphate, the strontium sulphate can be readily converted to strontium carbonate which can then be reused when the process is again accomplished. A preferred manner in which strontium sulphate can be converted to strontium carbonate is described in my copending application entitled "Preparation of Strontium Carbonate," Ser. No. 204,710, filed on even date herewith. It is therein disclosed that ammonium carbonate or an amine carbonate such as that from mono or tri-ethanol amine readily react with strontium sulphate under mild reaction conditions to produce strontium carbonate. The reaction is preferably carried out, for example, in an aqueous system with ammonium carbonate dissolved therein and the strontium sulphate present in finely divided form. The reaction to form the insoluble strontium carbonate proceeds at moderate temperatures with gentle agitation of the reaction system. While in order to achieve acceptable reaction rates and urge the reaction to completion, an excess quantity of ammonium carbonate (i.e., the molar ratio of carbonate to sulphate is at least about 1.5) is employed, the excess quantity of the carbonate can be easily recovered after the reaction is complete by simple distillation.

The method disclosed in my copending application for preparing strontium carbonate is preferred for use in the present process since it is inexpensive to accomplish and is not accompaneid by the formation of toxic or obnoxious by-products. However, it should be understood that other methods for converting strontium sulphate to stronium carbonate such as through the use of sodium carbonate can also be used.

The present invention is further illustrated by the following example.

One liter of aqueous brine was prepared containing the following ingredients:

| | Grams |
|---|---|
| Sodium | 93 |
| Potasium | 6 |
| Magnesium | 11 |
| Chloride | 170 |
| Sulphate | 14 |

The following solution was then added to the brine:

| | | |
|---|---|---|
| Strontium carbonate | grams | 21.5 |
| Hydrochloric acid | cc | 28 |
| Water | cc | 50 |

On addition of the solution to the brine, a strontium sulphate precipitate was almost immediately formed and filtered from the aqueous system after allowing the system to stand for about 10 hours. 23.9 grams of precipitate were recovered. The sulphate content of the brine was reduced to 1.4 grams.

The precipitate was then treated with a solution of 41.8 grams of ammonium carbonate in 80 cc. of water for 18 hours under mild agitation. 18.95 grams of insoluble material were obtained which analyzed 99.2% strontium carbonate. Strontium recovery was thus 88%. The strontium carbonate so formed can then be used in removing sulphate from a subsequent lot of brine, it being only necessary to add a small quantity of independently obtained strontium carbonate.

While the invention has been illustrated with respect to the treatment of brines, it will be appreciated that it is applicable to the general removal of sulphate ions from any aqueous solution.

I claim as my invention:

1. In a process for removing sulphate from natural or waste brines, the steps comprising adding strontium carbonate, strontium chloride, or a combination thereof to the brine to form insoluble strontium sulphate, removing the insoluble strontium sulphate so formed, converting the strontium sulphate so formed to strontium carbonate by reaction with ammonium carbonate, an amine carbonate or sodium carbonate and using the strontium carbonate so formed for the removal of sulphate from a subsequent lot of brine.

2. The process of claim 1 wherein strontium sulphate is converted to strontium carbonate by reaction with ammonium carbonate or an amine carbonate.

References Cited

UNITED STATES PATENTS

| 3,525,675 | 8/1970 | Gaudin | 203—7 |
| 2,044,954 | 6/1936 | Peirce | 423—554 |
| 301,383 | 7/1884 | Mebvs et al. | 423—431 |
| 413,432 | 10/1889 | Bradburn et al. | 423—554 X |

MICHAEL ROGERS, Primary Examiner

U.S. Cl. X.R.

159—Dig. 13; 203—7; 423—431, 554